Sept. 21, 1954 S. S. L. CHANG Re. 23,872

FLAT ROTARY PUMP

Original Filed April 29, 1950 3 Sheets-Sheet 1

INVENTOR.
SHELDON S. L. CHANG,
BY Allen & Allen
ATTORNEYS.

INVENTOR.
SHELDON S. L. CHANG,
BY Allen & Allen
ATTORNEYS.

FLAT ROTARY PUMP

Original Filed April 29, 1950 3 Sheets-Sheet 3

INVENTOR.
SHELDON S. L. CHANG,
BY Allen & Allen
ATTORNEYS.

Reissued Sept. 21, 1954

Re. 23,872

UNITED STATES PATENT OFFICE 23,872

FLAT ROTARY PUMP

Sheldon S. L. Chang, New York, N. Y., assignor to Robbins & Myers, Inc., Springfield, Ohio, a corporation of Ohio Original No. 2,590,435, dated March 25, 1952, Serial No. 159,077, April 29, 1950. Application for reissue June 10, 1953, Serial No. 360,854

15 Claims. (Cl. 103—133)

Matter enclosed in heavy brackets [ ] appears in the original patent but forms no part of this reissue specification; matter printed in italics indicates the additions made by reissue.

This invention relates to a pump having [relatively flat, disc-like] pumping elements *which may be relatively flat, or disc-like,* wherein the pumping elements are provided with spiral threads and wherein one of the elements has one thread more than the other element. In the particular embodiment to be disclosed herein the stator element is shown as having a double thread while the rotor is shown as having a single thread. Reference is made to the copending application of Byram and Chang, Serial No. 159,078 filed April 29, 1950, *now Patent No. 2,590,751, dated March 25, 1952,* and copending herewith wherein there is a general disclosure of pumps of the type here under discussion. Reference is also made to the copending application of Chang and Hagerman, Serial No. 146,334, filed February 25, 1950, now Patent No. 2,566,116 issued August 28, 1951, wherein there is disclosed a machine for forming the pumping elements of the pump here under consideration.

It is an object of the present invention to provide a rotor surface and a stator surface which will function together to provide pumping pockets for conveying material to be pumped through the pump. The foregoing and other objects which will appear more fully hereinafter or which will be set forth specifically I accomplish by that construction and arrangement of parts of which I shall now disclose several exemplary embodiments. Reference is made to the drawings forming a part hereof and in which.

Figure 1:
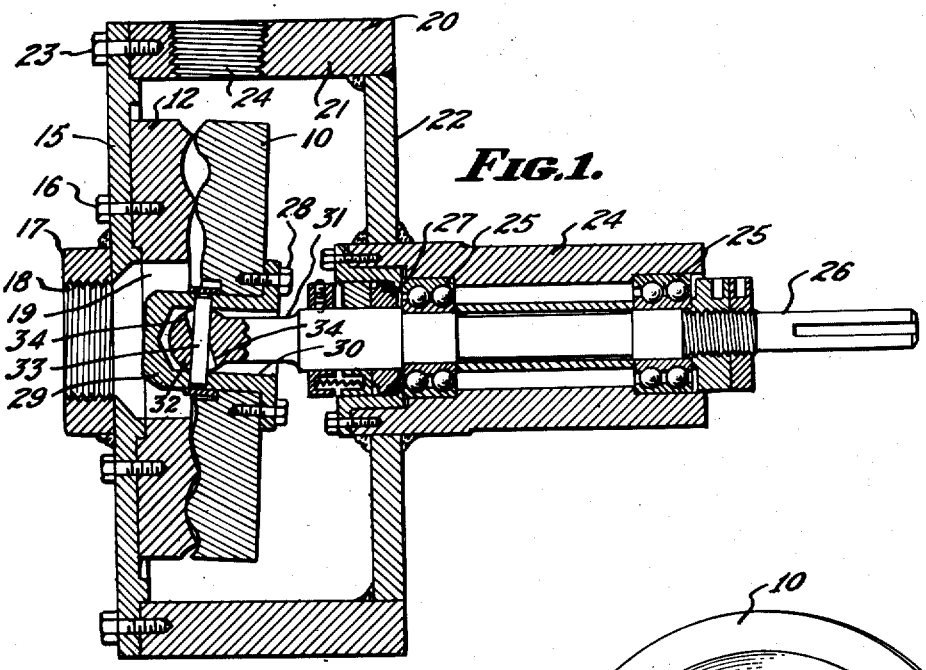
Figure 1 is a central longitudinal cross sectional view through a pump employing pumping elements according to the present invention.
Figure 2:
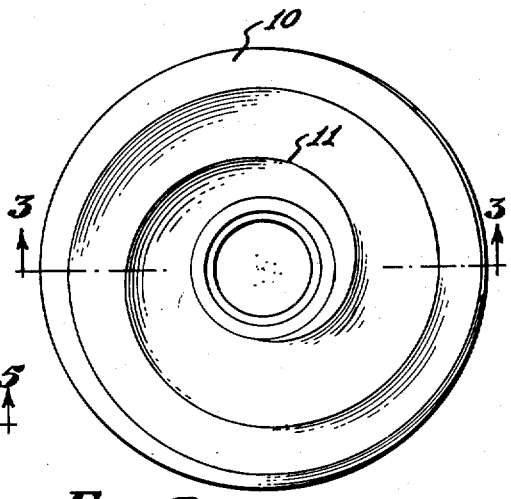
Figure 2 is a plan view of a rotor according to the present invention.
Figure 4:
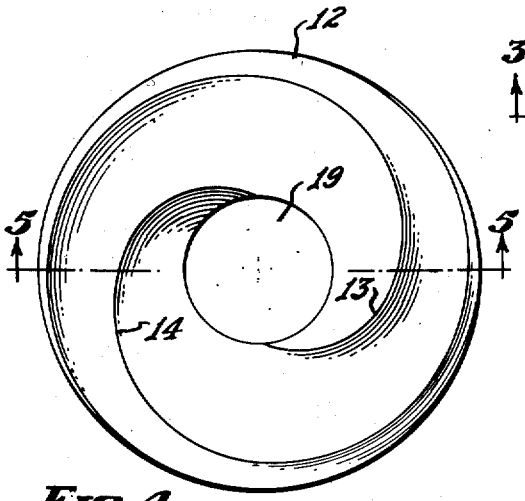
Figure 4 is a plan view of a stator according to the present invention.
Figure 3:
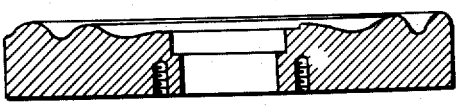
Figure 3 is a cross sectional view of the same taken on the line 3—3 of Figure 2.
Figure 5:
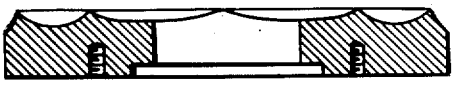
Figure 5 is a cross sectional view of the same taken on the line 5—5 of Figure 4.

A pump such as the one in which the rotors and stators hereinafter to be described and claimed may be used as shown in cross section in Figure 1. The rotor is indicated at 10, and it has a single spiral thread, the crest of which is indicated in Figure 2 at 11. The stator is indicated at 12 and has a double spiral thread as indicated by the crests 13 and 14. As shown in Figure 1, the stator 12 may be secured by bolting to a head 15 as indicated at 16. The head 15 may be provided with a port fitting 17 having the thread 18 for attachment to a pipe. The stator 12 has a central hole 19 for the passage of fluid which is being pumped.

The casing of the pump 20 may, as shown, consist of a ring 21 and a plate 22 welded together and bolted to the head 15 by means of bolts 23. A sleeve 24 may be welded or otherwise suitably attached to the plate 22 to serve to hold the shaft bearing 25 for the drive shaft 26. It will be clear that the casing consisting of the members 21, 22 and 24 could be cast from a single piece of metal if desired. Suitable sealing means are provided as at 27 to seal the shaft 26 against the sleeve 24. The casing is provided with the exhaust port 24. Because of the compound movement of the rotor with respect to the stator, universal joint means must be provided for driving the rotor from the shaft 26 which rotates on a fixed axis. Therefore bolts 28 secure a cup-like member 29 to the rotor 10. The member 29 is provided with an accurately dimensioned hole 30 and the end of the drive shaft 26 has a portion 31 of reduced diameter and terminates in a spherical portion 32. Rotation is transmitted from the shaft 26 to the rotor by means of a pin 33 which is secured in diametrically opposed holes in the member 29 and which passes through a slot 34 in the ball 32. The slot 34 is of a width (in a plane perpendicular to the paper) to snugly accommodate the pin 33 and of a width (in the plane of the paper) at its center to snugly accommodate the pin 33. The slot 34 however flares at both ends to permit the cup and rotor and the pin 33 secured thereto to tilt with respect to the ball 32 and shaft 26. The particular movement as will appear more clearly hereinafter involves the rotation of the rotor about a tilted axis wherein the tilted axis moves azimuthally, or nutates, in a direction opposite to the direction of rotation of the rotor. The movement of the tilted axis is analogous to the movement of the axis of a dying top except that the angle of tilt remains constant.

Figure 7:
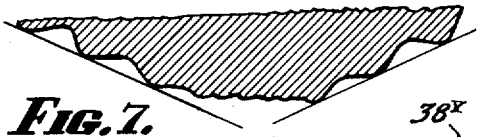
Figure 7 is a diagrammatic view in cross section of a rotor generated according to Figure 6.
Figure 6:
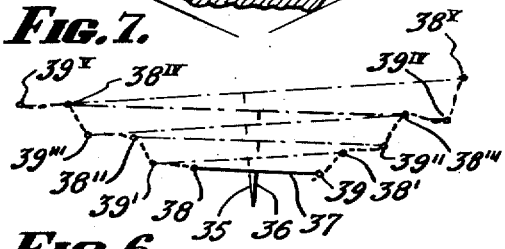
Figure 6 is a diagram to assist in an understanding of how the surface of a rotor is generated.

Coming now to a specific description of the surfaces of the rotor and stator and to a description of the manner in which these surfaces are generated, Figures 6 to 15 inclusive have to do with the generation of rotor surfaces, and several embodiments of rotor surfaces are shown. Referring first to Figure 6, I have shown at 35 a cone and at 36 an element of the cone 35. At 37 I have indicated (in edge view) a circle in a plane perpendicular to the element 36 and drawn about the element 36 as a center. Let it now be assumed that the element 36 is slowly caused to move around the surface of the cone 35 and that while the element 36 is so moving the length of the element is gradually increased and that, at the same time, the diameter of the circle 37 is constantly being increased. As these various movements are taking place the points 38 and 39 move respectively and successively (using 180° intervals for purposes of the illustration) to the points 38', 39', 38'', 39'', 38''', 39''', 38$^{IV}$, 39$^{IV}$, 38$^{V}$, 39$^{V}$, and a surface will be generated which in cross section will appear as shown in Figure 7.

It was mentioned above that the length of the element 36 of the cone 35 was changing constantly and that the diameter of the circle 37 was also changing constantly, and it has been assumed in Figures 6 and 7 that the changes in length of the element and diameter of the circle are proportional. The rotor element, produced as shown in Figure 7, I have designated as a cone-type of rotor.

Figure 9:
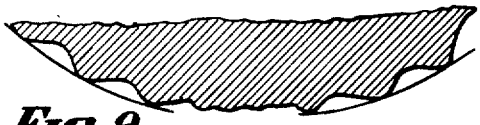
Figure 9 is a view similar to Figure 7 showing in cross section the rotor generated according to Figure 8.
Figure 8:
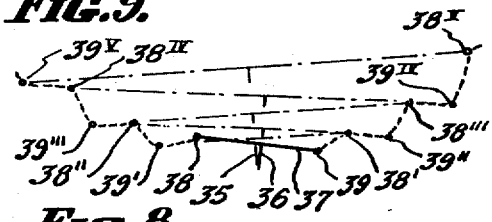
Figure 8 is a view similar to Figure 6 showing a different type of rotor in the process of being generated.
Figure 12:
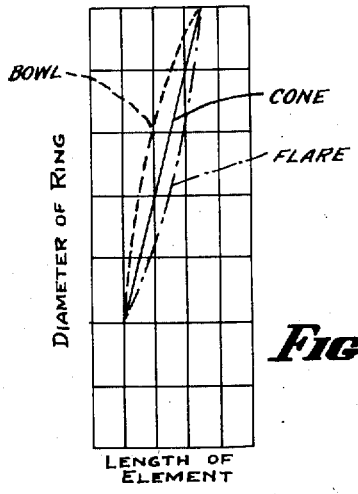
Figure 12 is a diagram to assist in an understanding of Figures 6 to 11 inclusive.
Figure 11:
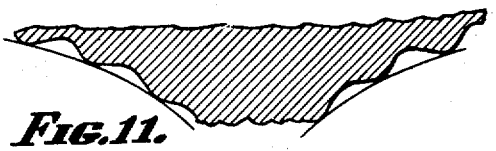
Figure 11 is a diagram in cross section of the rotor surface generated according to Figure 10.
Figure 10:
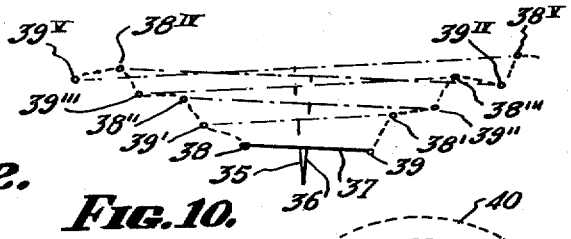
Figure 10 is a diagram similar to Figures 6 and 8 showing yet another method of generating a rotor surface.

If the changes of diameter of the circle and length of the element are non-proportional, as shown in Figures 8 and 9, the rotor surface produced is what I have designated a bowl-type, as long as the increase in diameter of the circle is more rapid than the increase in the length of the element. If the increase in the length of the element is more rapid than the increase in diameter of the circle, then a flare-type of rotor is produced as shown in Figures 10 and 11. Referring more particularly to the graph of Figure 12 where I have plotted diameter of the ring or circle against length of the element, the solid line indicates the proportional increase of the two variables which produces the cone-type of pump. The upper broken curve line indicates the situation in the production of the bowl-type of rotor and the lower broken line indicates the situation in the formation of a flare-type of rotor. For convenience the same numerals have been used in Figures 8 and 10 as were used in Figure 6.

Figure 13:
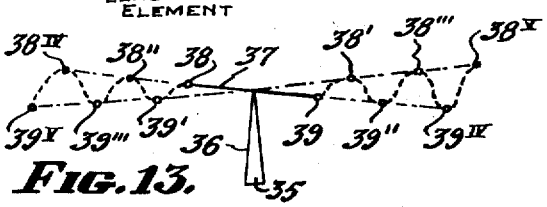
Figure 13 is a view similar to Figures 6, 8 and 10 showing how a flat pump element is generated.
Figure 14:
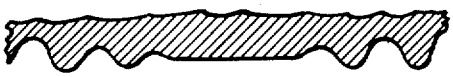
Figure 14 is a diagram in cross section of a rotor generated according to Figure 13.

If, on the other hand, the length of the element is maintained constant and the only change is in the diameter of the generating circle, then the situation will be as shown in Figures 13 and 14 and the rotor generated will be what I have called a flat rotor. Here again the cone has been designated at 35 and the element at 36. The circle is again indicated at 37 and the progress of the points 38 and 39 is illustrated as before. The rotor surfaces produced according to Figures 6, 8, 10 and 13 are shown respectively in the cross sectional diagrams of Figures 7, 9, 11 and 14.

Figure 15:
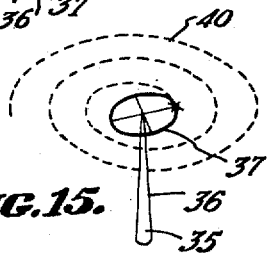
Figure 15 is another diagram to assist in an understanding of the generation of a rotor surface.

The diagram of Figure 15 shows in perspective the trace of the high points of the generating circle 37 which trace is shown in broken lines at 40, and it will be clear from the consideration of Figure 15 in connection with the above described figures that in all of these cases a generally spiral thread is produced.

[The views of Figures 6, 7, 8, 9, 10 and 11 have been somewhat exaggerated in that actually there will not be as much difference between the flat pump and the cone, bowl and flare shaped pumps as appears in the drawing. This has been done to facilitate an understanding of how the surfaces are generated. The pumping elements can be generally described as relatively flat, disc-like members with generally spiral threads.]

It will also be observed that while in Figures 6 to 11 inclusive both the length of the generating element and the diameter of the generating circle are changing, in the arrangement of Figures 13 and 14 only the diameter of the generating circle is changing. However, in all cases the distance from the apex of the cone to any point on the periphery of the circle is changing and therefore the change which is taking place can be defined generically as a change in the distance from the apex of the generating cone to a point on the periphery of the generating circle. The change in this dimension may result either from a change in the dimension of the circle alone or from a change in the dimension of the circle and the length of the element together.

Figure 16:
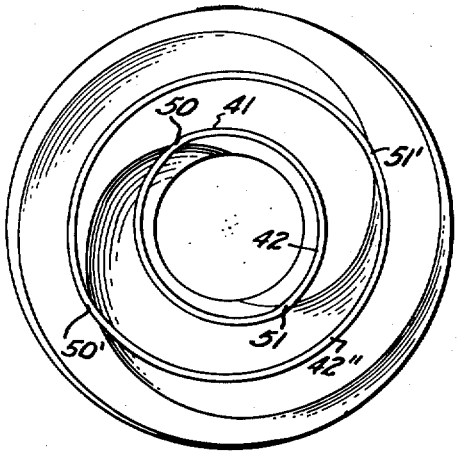
Figure 16 is a plan view of a stator showing a number of generating semi-circles superimposed thereupon.
Figure 17:
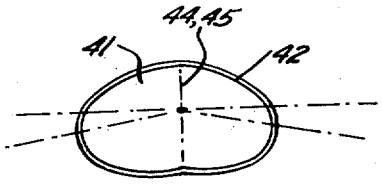
Figure 17 is a perspective view of a pair of semi-circles such as are used in generating the stator surface of Figure 16.
Figure 18:
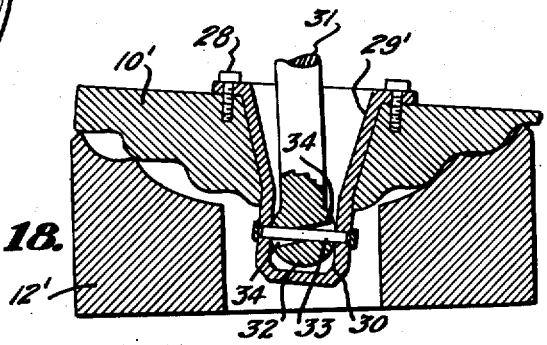
Figure 18 is a fragmentary cross sectional view of a pair of pumping elements in cooperating relationship but showing a different embodiment from Figure 1.
Figure 19:
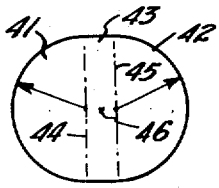
Figures 19, 20 and 21 are diagrams useful in connection with an understanding of the generation of the stator surface.
Figure 21:
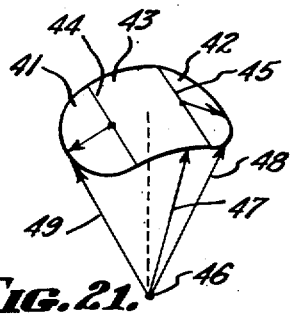
Figure 20:
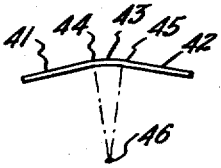

Figures 16 to 21 inclusive show the manner in which a stator surface is generated. In its broadest and most generic aspect let us assume a pair of semi-circles as indicated in Figures 19, 20 and 21 at 41 and 42. These semi-circles are of the same diameter and are connected by a rectangular portion of a cylinder, as indicated at 43. The semi-circles 41 and 42 are in planes at a fixed angle to each other, and the cylindrical surface 43 is tangent to the planes in which lie the semi-circles 41 and 42 at the diameters of the semi-circles. Thus the surfaces 41 and 43 are tangent at the line 44 and the surfaces 42 and 43 are tangent at the line 45. In connection with this figure there [must be assumed] *exists* a fixed point 46 which is equidistant from every point on the periphery of the figure. Since the portion 43 is cylindrical, it will be clear that any portion on the edge of the cylindrical connecting portion will be equidistant from a point 46 as indicated by the arrow 47. Since the semi-circles 41 and 42 are in planes which are tangent at the diameters to the cylindrical surface 43, all points on the semi-circular portion of the periphery of the figure will be equidistant from the point 46 as indicated by the arrows at 48 and 49. Thus every point around the periphery of the figure is equidistant from a point 46. If now the figure be rotated about an axis passing through the fixed point 46, while the distance 47, 48 or 49 is continually changing, a double threaded surface will be generated. Here again, as was pointed out in connection with the rotors, the distance from the fixed point 46 to any point on the periphery of the figure can change for two reasons: it can change first because the radius of the cylinder is changing and it can change second because the diameters of the semi-circles are changing and it can change third because both the radius of the cylinder and the diameters of the semi-circles are changing. As before, if the change of the two variables is proportional, there will be produced a cone-type stator whereas if the change is not proportional, there will be produced either a bowl or a flare-type stator, depending upon whether the diameters of the semi-circles are increasing more rapidly or less rapidly than the radius of the cylinder. Again, as in connection with the rotors described above, if the radius of the cylinder reduces to 0 so that the diameters 44 and 45 of the semi-circles 41 and 42 come together and coincide, as shown in Figure 17, there will be produced a flat stator, as illustrated in Figure 16. In Figure 16 there has been superimposed upon the figure of the stator a folded ring such as that of Figure 17 wherein there are the semi-circles 41 and 42 wherein the high points, i. e. the opposite ends of the mutual or common diameter, are indicated at 50 and 51. There has also been superimposed on the figure a pair of semi-circles 41′ and 42′ having their high points at 50′ and 51′. With what has been said before in connection with the rotors, it will be clear how the figures described generate the various forms of stators.

I have described above in considerable detail the generation of the rotor and stator surfaces. It remains, however, to set forth the conditions which must prevail in order that a rotor and stator may work together as a pump for compressor or expander. It is necessary that the apex of the generating cone of the rotor must coincide with the fixed point of the stator (i. e. the apex of the cone 35 must coincide with the point 46). It is also necessary that the fixed angle of the stator generating surface must be twice the apex angle of the cone. (The dihedral angle between the surfaces 41 and 42 must be twice the apex angle of the cone 35. In other words, the angle of wobble of the rotor equals the apex angle of the cone.) It is necessary that the length of the element of the cone equal the radius of the cylinder (thus the length of the element 36 must equal the radius of the cylindrical portion 43). It is further necessary that the radius of the circle used in generating the rotor surface be equal to the radii of the semi-circles used in generating the stator surface (thus the radius of the circle 37 must equal the radii of the semi-circles 41—42).

Finally it is necessary that the azimuthal angle of the generating element of the cone must at all times equal twice the azimuthal angle of the figure.

If the foregoing conditions are met in the generation of the rotor and stator surfaces then these surfaces will coact together to form a compressor or an expander, depending upon the [constancy] *variation* of the pitch.

In Figure 18 I have shown the working elements of a cone-type pump which are in all respects similar to those shown in Figure 1 where flat type elements are illustrated. The only difference in Figure 18 is that the hole through the rotor must be flared and the cup member 29′ must be flared to permit of the rocking movement heretofore described. In other respects the universal joint connection is the same. Similar reference numerals have been used in Figure 18 as were used in Figure 1, except that the rotor and stator have been identified respectively as 10′ and 12′. As was pointed out above, if the pitch of the threads is constant the two elements will function either as a compressor or an expander depending upon the direction of movement of the pumping pocket, whereas if the threads are distorted so their pitch is not constant but is less at the periphery than in the center, then a constant volume pump is provided.

It will be clear that various modifications in detail may be made without departing from the spirit of my invention, and I therefore do not intend to limit myself except as set forth in the claims which follow.

Having now fully described my invention, what I claim as new and desire to secure by Letters Patent is:

1. A pumping member for a rotary pump, [comprising a disc-like] *said* member having a spiral thread progressing outwardly from the axis, the surface of said member being approximately that generated by a circle about an element of a cone in a plane perpendicular to said element, as said element is moved around the surface of said cone, accompanied by a continuous change in the distance from the periphery of said circle to the apex of said cone.

2. A pumping member according to claim 1, wherein the length of the element of the cone is constant, and said change in distance results from a continuous change in the diameter of said circle.

3. A pumping member according to claim 1, wherein the change in distance results from a continuous change in the position of said circle along said element and a continuous change in the diameter of said circle.

4. A pumping member according to claim 1, wherein the change in distance results from a continuous change in the position of said circle along said element and a continuous proportional change in the diameter of said circle.

5. A pumping member according to claim 1, wherein the change in distance results from a continuous change in the position of said circle along said element and a continuous non-proportional change in the diameter of said circle.

6. A pumping member for a rotary pump, [comprising a disc-like] *said* member having a double, spiral thread progressing outwardly from the axis, the surface of said member being approximately that generated by a figure comprising: two semi-circles in planes at a fixed angle to each other connected by a rectangular portion of a cylinder tangent to said planes at the diameters of said semi-circles, such that every point on the periphery of said figure is at an equal distance from a fixed point; when said figure is rotated about an axis passing through said fixed point and the center of said figure, accompanied by a continuous change in the distance from said fixed point to a point on the periphery of said figure.

7. A pumping member according to claim 6, wherein the radius of said cylinder is constant, and the change in distance results from a continuous change in the diameter of said semi-circles and the axial length of said portion of a cylinder.

8. A pumping member according to claim 6, wherein the change in distance results from a continuous change in the radius of said cylinder and a continuous change in the diameter of said semi-circles and the axial length of said portion of a cylinder.

9. A pumping member according to claim 6, wherein the change in distance results from a continuous change in the radius of said cylinder and a continuous proportional change in the diameter of said semi-circles and the axial length of said portion of a cylinder.

10. A pumping member according to claim 6, wherein the change in distance results from a continuous change in the radius of said cylinder and a continuous non-proportional change in the diameter of said semi-circles and the axial length of said portion of a cylinder.

11. A pump comprising a pair of pumping members, one of said members being fixed, a shaft for driving the other of said members, the other of said members being connected to said shaft by a universal joint, [each of said members being disc-like in shape,] one of said members having a spiral thread progressing outwardly from its axis, and having a surface approximately that generated by a circle about an element of a cone in a plane perpendicular to said element, as said element is moved around the surface of said cone, accompanied by a continuous change in the distance from the periphery of said circle to the apex of said cone; the other of said members having a double, spiral thread progressing outwardly from its axis, and having a surface approximately that generated by a figure comprising: two semi-circles in planes at a fixed angle to each other connected by a rectangular portion of a cylinder tangent to said planes at the diameters of said semi-circles, such that every point on the periphery of said figure is an equal distance from a fixed point; when said figure is rotated about an axis passing through said fixed point and the center of said figure, accompanied by a continuous change in the distance from said fixed point to a point on the periphery of said figure; the relation between said members being approximately such that the apex of the generating cone of said one member is at the fixed point of said other member, that the fixed angle of said other member is twice the apex angle of said cone, that the length of the element of said cone equals the radius of said cylinder, that the radius of said circles equal the radii of said semi-circles, and that the azimuthal angle of the generating element of said one member is at all times equal to twice the azimuthal angle of said figure, and casing means enclosing said members and having intake and exhaust ports and an entry aperture for said shaft.

12. A pump according to claim 11, wherein the length of the said element of the cone, and the radius of said cylinder are constant, and the changes in distance result respectively from a continuous change in the diameter of said circle, and a continuous change in the diameter of said semi-circles and the axial length of said portion of a cylinder.

13. A pump according to claim 11, wherein the changes in distance result respectively from: a continuous change in the position of said circle along said element and a continuous change in the diameter of said circle; and from a continuous change in the radius of said cylinder and a continuous change in the diameter of said semi-circles and the axial length of said portion of a cylinder.

14. A pump according to claim 11, wherein the changes in distance result respectively from: a continuous change in the position of said circle along said element and a continuous proportional change in the diameter of said circle; and from a continuous change in the radius of said cylinder and a continuous proportional change in the diameter of said semi-circles and the axial length of said portion of a cylinder.

15. A pump according to claim 11, wherein the changes in distance result respectively from: a continuous change in the position of said circle along said element and a continuous non-proportional change in the diameter of said circle; and from a continuous change in the radius of said cylinder and a continuous non-proportional change in the diameter of said semi-circles and the axial length of said portion of a cylinder.

References Cited in the file of this patent

UNITED STATES PATENTS

| Number | Name | Date |
|---|---|---|
| 615,392 | Kelley | Dec. 6, 1898 |
| 1,389,189 | Feuerheerd | Aug. 30, 1921 |
| 2,212,417 | George | Aug. 20, 1940 |
| 2,324,168 | Montelius | July 13, 1943 |
| 2,353,373 | Thompson | July 11, 1944 |
| 2,512,764 | Byram | June 27, 1950 |

FOREIGN PATENTS

| Number | Country | Date |
|---|---|---|
| 28,560 | Denmark | Sept. 21, 1921 |
| 129,104 | Austria | July 11, 1932 |
| 367,086 | Great Britain | Feb. 18, 1932 |
| 441,528 | Great Britain | Jan. 21, 1936 |
| 622,583 | Great Britain | May 4, 1949 |
| 813,559 | France | Mar. 1, 1937 |